United States Patent

[11] 3,563,356

[72] Inventor: Leon A. Glickman
 Westwood, Mass.
[21] Appl. No.: 812,026
[22] Filed: Apr. 1, 1969
[45] Patented: Feb. 16, 1971
[73] Assignee: Keystone Manufacturing Corporation
 Boston, Mass.
 a corporation of Massachusetts

[54] SAFETY MECHANISM
 12 Claims, 8 Drawing Figs.
[52] U.S. Cl. .................................. 192/131, 100/53
[51] Int. Cl. .................................. F16d 9/00
[50] Field of Search ........................... 100/53; 192/131

[56] References Cited
UNITED STATES PATENTS
2,046,531  7/1936  Page ........................... 192/131
3,246,728  4/1966  Hicks, Jr. et al. ............... 192/131

FOREIGN PATENTS
523,750  4/1955  Italy ........................... 100/53

Primary Examiner—Milton Kaufman
Attorney—Willis M. Ertman

ABSTRACT: A safety mechanism includes an operating member movable between a normal position and an actuating position. The operating member has a camming surface and two latch recesses at its lower end and an actuator portion at its upper end. A pair of camming members, each having an inclined ramp surface and a nose portion, cooperate with the operating member. A manual control is connected to each camming member. Substantially simultaneous movement of both manual controls causes the ramp surfaces to impart a balanced camming action on the operating member to move the actuator portion to an actuating position. Should the movement of one inclined surface exceed the movement of the other surface by a predetermined amount, its movable portion and a corresponding recess will be latched, preventing movement of said actuator portion to the actuating position. A manually operable reset structure is provided to release the latched members.

Patented Feb. 16, 1971
3,563,356
2 Sheets-Sheet 1
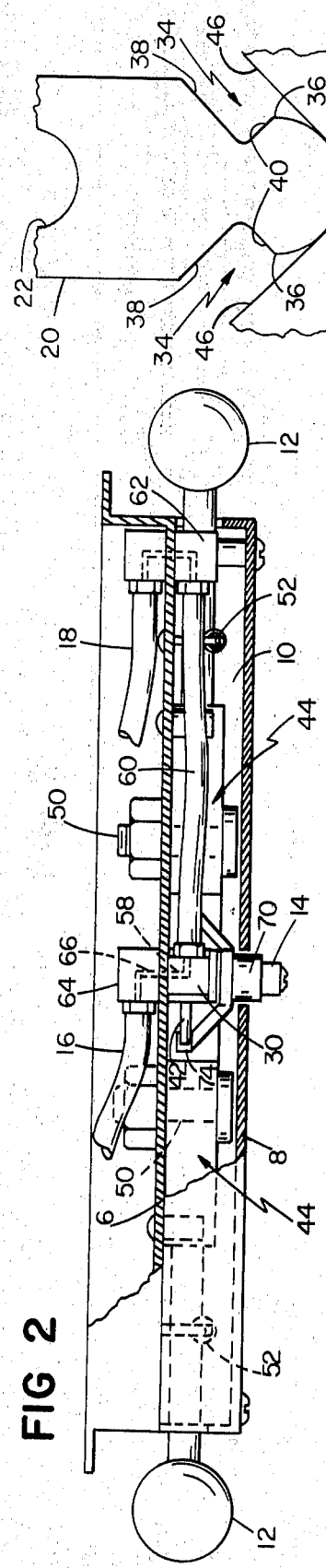
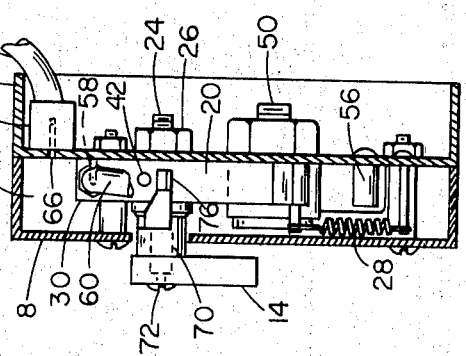
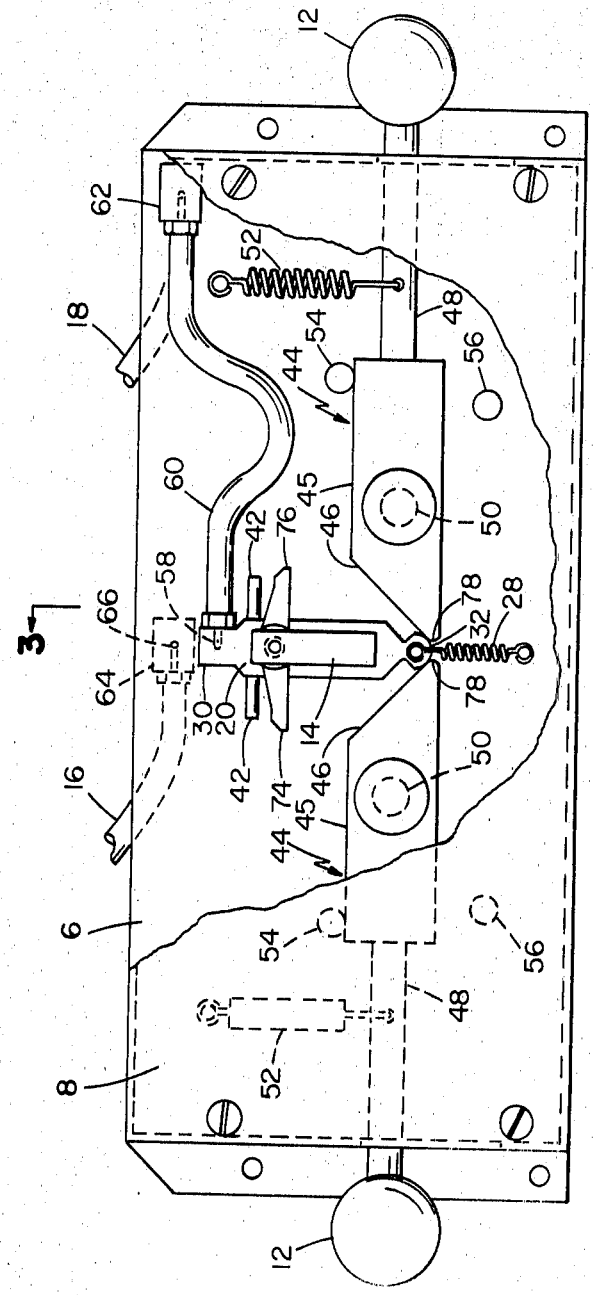

Patented Feb. 16, 1971

SAFETY MECHANISM

SUMMARY OF THE INVENTION

This invention relates to safety mechanisms generally and more particularly to a safety mechanism for use as a control for equipment, especially in connection with the machinery which performs operations on workpieces which may be hand fed into the machine or in connection with which an operator is customarily required.

In the use of such machinery, there is great danger of injury to the hands of the operator. A variety of safety mechanisms have been proposed which require the operator to use both hands to operate the controlled machine, but in many instances this protection is defeated by various techniques such as tying down one of the operating manuals. A variety of safety mechanism arrangements have been proposed which avoid these limitations but they have been, in general, complex, bulky, and/or expensive.

Accordingly, it is a primary object of this invention to provide a novel and improved safety mechanism which requires two-hand operation and which is simple, inexpensive, and reliable.

Another object of the invention is to provide a novel and improved safety mechanism which is compact and which may easily be attached to existing equipment.

Another object of the invention is to provide a novel and improved safety mechanism arranged to control the operation of heavy machinery such as punch presses or the like which requires only a small power input.

In accordance with one aspect of the invention a two hand control device for machines has an operating member arranged for movement between a normal position and an actuating position, a pair of camming members, a pair of manual controls, one for each hand, structure coupling each manual control to a corresponding camming member, each camming member being mounted to engage the operating member and impose a lateral component of movement on the operating member to move the operating member to latching engagement with the camming member when its corresponding manual control only is operating, preventing movement of the operating member to the actuating position, and, when both manual controls are operated substantially simultaneously, the camming members concurrently impart a balanced camming action on the operating member to move the operating member to the actuating position, and structure for releasing the camming and operating members from latching engagement with one another.

In accordance with another aspect of the invention a two hand control mechanism for actuating machinery has a latching structure, control apparatus movable between a first position in which the machinery is not actuated, a second position in which the machinery is actuated, and at least one third position in which the machinery is not actuated and the latching structure effectively prevents the switching apparatus from moving, a pair of manual controls arranged to move the control apparatus between the first and second position when the controls are operated substantially simultaneously and to move the switching apparatus from the first position to the third position when the controls are not operated substantially simultaneously, and reset apparatus arranged to return the switching apparatus from the third position to the first position. In preferred embodiments the switching apparatus is spring-biased in the first position and the controls are spring-biased in the manner to permit the switching apparatus to remain in the first position until at least one of the controls is operated, the controls are levers with operating handles and lever camming surfaces; and the switching apparatus includes a rotatably and slidingly mounted member that has a lower curved camming surface and an upper actuating portion. The levers are mounted for rotation between first and second stops, and the lever camming surfaces are arranged to cooperate with the member camming surface to slide the member from the first position to a second (actuating) position when the levers are rotated substantially simultaneously from the first stops to the second stops and to rotate the member to the third position when one of the lever camming surfaces is rotated substantially ahead of the other lever camming surface. The upper actuating portion is arranged to operate a valve or switch when the member is in the second position. The member also has adjacent its camming surface two latching recesses, and each lever has a nose portion arranged to engage a cooperating recess. Removal of the lever nose portion from the recess by movement of its lever is prevented when the member is in the third (latched) position. The reset mechanism in a preferred embodiment includes a horizontal pin structure which cooperates with a rotatably reset button that has two reset camming surfaces. Rotation of the reset button causes a reset camming surface to engage and lift a pin and rotate the switching control member to release the latched engagement of a recess and a lever nose when the member is in the third position and permit the member to return to the first position.

Safety mechanisms constructed in accordance with the invention provide compact units which may be easily attached to existing machinery. Such mechanisms require concurrent use of two hands, are simple and reliable in operation, and are fail safe.

Other objects, features and advantages of the invention will be seen as the following description of a particular embodiment of the invention progresses. It will be clear that this description is illustrative and not limiting. Many modifications within the spirit and scope of the invention may be made in the disclosed embodiment. For example, it will be apparent that configurations of the camming surface and latch recesses different from those in this particular embodiment may be employed.

In the drawings:

FIG. 2 is a front elevational view with a compartment cover partially broken away, of a safety mechanism constructed in accordance with the invention;

FIG. 2 is a top view, with parts broken away, of the mechanism shown in FIG. 1;

FIG. 3 is a sectional view taken along the line 3–3 of FIG. 1;

FIG. 7 is an enlarged diagrammatic view of the relationship of ramp members and operating member surfaces employed in the mechanism shown in FIG. 1.

DESCRIPTION OF PARTICULAR EMBODIMENT

Figure 4:
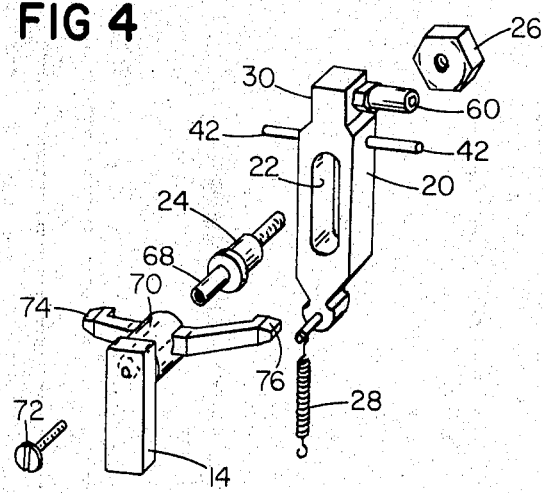
FIG. 4 is an exploded perspective view of the reset arrangement employed in the mechanism shown in FIG. 1.

With reference to FIGS. 1—3, the safety mechanism is mounted on a base plate 6 and enclosed with a cover structure 8 which cooperates with plate 6 to form a compartment 10 which houses the actuating mechanism. Two operating manuals in the form of handles 12 project from the compartment, one on the left side and the other on the right side. A reset handle 14 is mounted on the front face of the compartment and connections for hoses 16, 18 are mounted on the rear face of the compartment. The structure thus is a compact unit which may be easily attached to an existing machine such as a punch press for control thereof.

The safety mechanism in the compartment includes an operating member in the form of bar 20 which has an elongated slot 22 formed in it and which is secured for sliding movement on base plate 6 by stud 24, stud 24 being secured to plate 6 by nut 26. Bar 20 is normally biased downwardly to the position shown in FIG. 1 by spring 28 in an arrangement which permits the bar to move vertically or rotationally with respect to stud 24.

The top of bar 20 carries an actuator portion 30 and a smoothly curved camming surface 32 of one-eighth inch radius is formed at its lower end. Two latching recesses 34 are formed in bar 20, one on either side of camming surface 32 and each being separated from surface 32 by a transition shoulder 36. Each latch recess is defined by two flat surfaces 38 and 40 that are disposed at right angles to one another and each at an angle of 45° to the axis of slot 22. Bar 20 also carries two pins 42 that project laterally from either side thereof just above the top of slot 22.

The safety mechanism also includes two actuating structures 44. Each actuating structure includes an operating manual in the form of a handle 12, a ramp camming member 45 that defines inclined camming surface 46 and a rod 48 which connects handle 12 with ramp member 45. Each actuating structure is mounted on base plate 6 for rotation about axis 50. Spring 52 biases the actuating structure against an upper stop 54 which limits the upward movement of handle 12 and a lower stop 56 limits the downward movement of each handle.

The actuating structure 30 at the top of bar 20 includes an outlet orifice structure 58 which is connected by flexible hose 60 to coupling structure 62 which in turn is arranged to be connected to a source of low pressure air (a pressure for example in the order of approximately one inch of water) through hose 18. Cooperating orifice structure 64 is mounted on the rear of base plate 6 and communicates with an orifice 66 which passes through base plate 6. Structure 64 is arranged for connection to hose 16 which is arranged to communicate with a transducer device such as an interface valve which initiates press operation.

A reset structure is mounted on shaft projection 68 of stud 24. That reset structure, as shown in FIG. 4, has a sleeve portion 70 which extends through an aperture in cover 8 and is connected to handle 14 that is disposed externally of cover 8. Screw 72 secures handle 14 and sleeve 70 to shaft 68. Sleeve 70 carries two arms 74, 76 which project laterally in opposite directions from the sleeve and are arranged to engage the rods 42 which project from either side of bar 20. It will be seen that rotation of handle 14 in the clockwise direction will cause arm 74 to engage the left rod 42 and rotate the bar in the clockwise direction; while rotation of handle 14 in the other direction will cause arm 76 to engage the right-hand rod 42 and rotate bar 20 in the counterclockwise direction.

Bar 20 is normally maintained in a vertical position by biasing spring 28. In this position as shown in FIG. 7, the radiused lower end surface 32 of bar 20 is in engagement with inclined surfaces 46 of the two ramp members 45. When the two handles 12 of the actuating structures are depressed substantially simultaneously, surfaces 46 rise at the same rate and move bar 20 vertically to a position in which orifice 58 in bar 20 is aligned with orifice 66 in base plate 6 so that air pressure from line 60 is applied to line 16 to operate the clutch of the punch press for example. It will be apparent that other actuating mechanisms instead of this low pressure fluidic control may be operated by the actuating portion, for example a three way control valve or a microswitch may be mounted directly on base 6 and operated by engagement with actuator structure 30.

Figure 8:
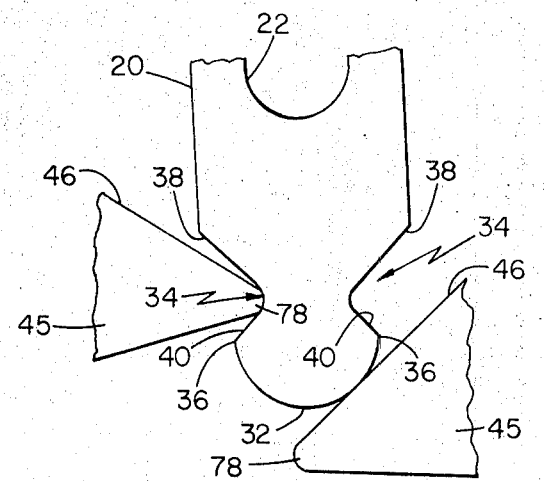
FIG. 8 is a diagrammatic view, similar to FIG. 7, showing the mechanism in a latched position.
Figure 5:
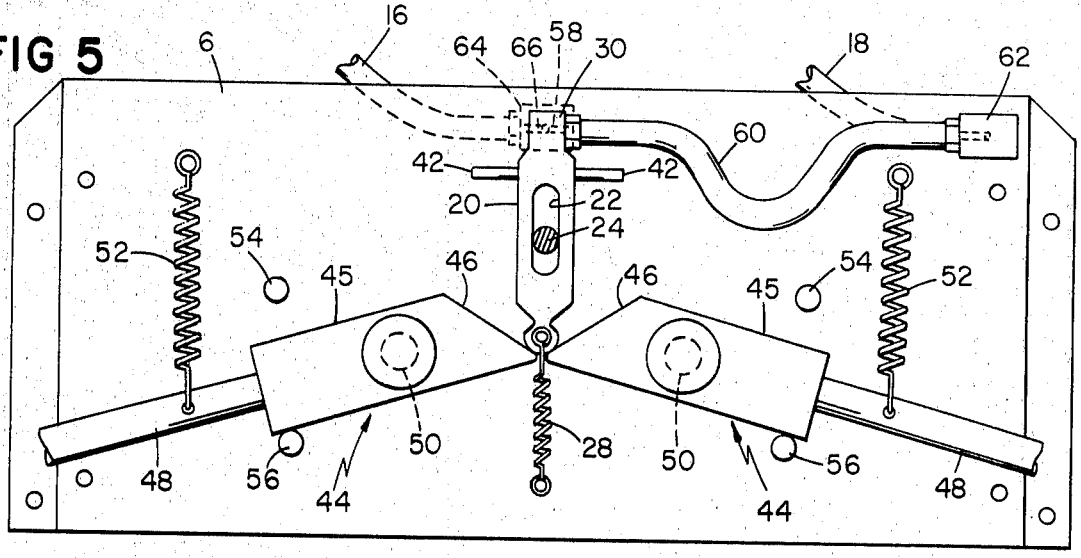
FIG. 5 is a diagrammatic view of the mechanism in actuated position.
Figure 6:
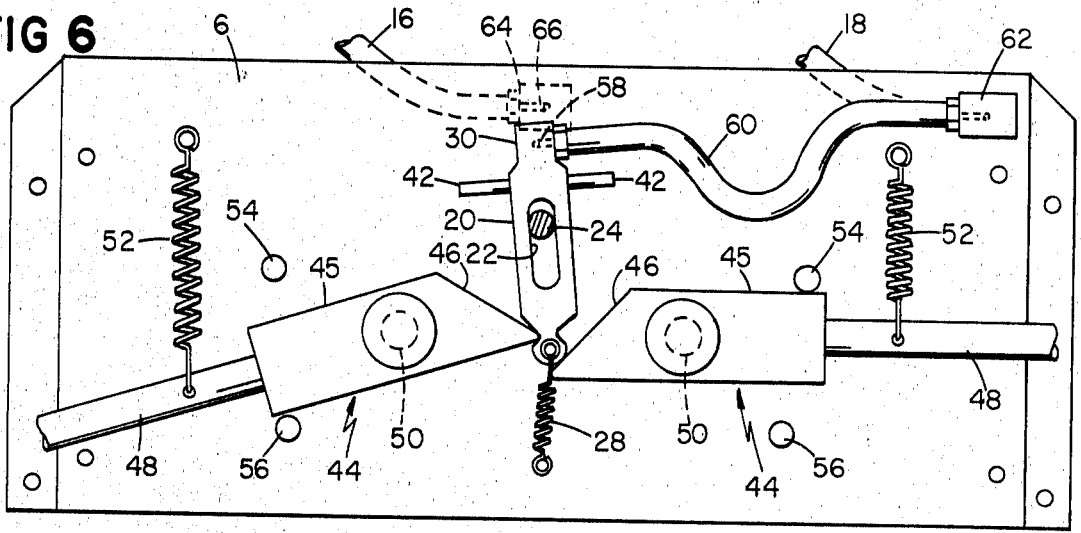
FIG. 6 is a diagrammatic view, similar to FIG. 5, of the mechanism in a latched, unactuated position.

Should either handle 12 be depressed ahead of the other handle, the inclined ramp surface 46 that is moved will force the lower end of bar 20 laterally along the inclined surface of the other lever. If the differential movement between ramp surfaces 46 exceeds the distance between nose 78 of the ramp structure and transition shoulder 38, the nose 78 will slide over that transition surface and be snapped into the latch recess 34 by spring 28. Further downward movement of that handle 12 will not actuate the controlled device but will only rotate the bar further, sliding it upwardly along the inclined surface of the other lever and the orifices 58 and 66 never become aligned. Also, the safety mechanism in this position is latched and, due to the configuration of the latching recess and the nose of the ramp structure, it is necessary for the operator to reset the mechanism by operation of handle 14. The reset mechanism may respond to other inputs, such as a pushbutton. This latched position is shown in FIGS. 6 and 8 and in that condition, rotation of handle 14 in the counterclockwise direction will cause arm 76 to engage the right-hand rod 42 and rotate bar 20 in the counterclockwise direction to release the latched nose of the left-hand actuating structure 44 so that structure is returned to its initial position by spring 52. Upon release of handle 14, spring 28 returns bar 20 to its initial position with camming surface 32 in contact with inclined surfaces 46 so that the operator may operate the controlled machine by depression of both handles 12.

Thus this mechanism provides a simply safety device suitable for connection to, and control of, larger machines, which safety device operates in a reliable manner and requires operation by two separate hands. The safety device cannot be tied down or bypassed to permit operation by one hand alone and where improper operation is attempted, the device is placed in latched condition which requires a reset operation.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

I claim:

1. A two hand control mechanism for actuating machinery, said mechanism comprising:
   a latching structure;
   switching apparatus having a member camming surface and an actuating portion, and being rotatably and slidingly mounted for movement between a first position in which said machinery is not actuated, a second position in which said machinery is actuated, and at least one third position in which said machinery is not actuated and said latching structure effectively prevents said switching apparatus from moving, means biasing said switching apparatus towards said first position;
   said latching structure comprising a pair of manual controls arranged to move said switching apparatus between said first and second positions when said controls are operated substantially simultaneously and to move said switching apparatus from said first position to said third position when said controls are not operated substantially simultaneously, said controls comprising levers mounted for rotation between first and second stops, and having operating handles and lever camming surfaces, said lever camming surfaces being arranged to cooperate with said member camming surface to slide said member from said first position to said second position when said levers are rotated substantially simultaneously from said first stops to said second stops and to rotate said member to said third position when one of said lever camming surfaces is rotated substantially ahead of the other of said lever camming surfaces;
   said actuating portion being arranged to actuate said machinery when said member is in said second position; and
   reset apparatus arranged to return said switching apparatus from said third position to said first position.

2. The mechanism of claim 1 wherein said member further comprises at least two recesses adjacent said member camming surface, each of said recesses has first and second recess edges, and each of said levers has first and second lever edges adjacent said lever camming surfaces, said first and second recess edges, respectively, being arranged to cooperate with said first and second lever edges in the manner to prevent one of said lever camming surfaces from being removed from one of said recesses by movement of one of said levers when said member is in said third position.

3. The mechanism of claim 2 wherein said member further comprises a horizontal pin and said reset apparatus comprises a bar carrying a plurality of reset camming surfaces and arranged to be rotated, at least one of said reset camming surfaces being arranged to cooperate with said pin to lift said pin and one of said recesses from engagement with one of said lever camming surfaces when said bar is rotated and said member is in said third position in the manner to permit said member to return to said first position.

4. The mechanism of claim 1 further comprising a normally open switch arranged to operate said machinery, said actuating portion being arranged to close said switch when said member is in said second position.

5. The mechanism of claim 4 wherein said actuating portion comprises an outlet orifice connected to an air pressure supply and arranged to apply air pressure and said switch comprises an inlet orifice communicating with an actuating device being sensitive to air pressure and arranged to actuate said machinery when air pressure is applied to said inlet orifice, said outlet orifice being arranged to be aligned with said inlet orifice when said member is in said second position.

6. A two hand control device for machines comprising an operating member arranged for movement between a normal position and an actuating position;

a pair of camming members;

a pair of manual controls, one for each hand, structure coupling each manual control to a corresponding camming member, each camming member being mounted to engage said operating member and impose a lateral component of movement on said operating member to move said operating member to latching engagement with said camming member when its corresponding manual control only is operated, preventing movement of said operating member to said actuating position, and, when both manual controls are operated substantially simultaneously, said camming members concurrently impart a balanced camming action on said operating member to move said operating member to said actuating position; and structure for releasing the camming and operating members from said latching engagement with one another.

7. The device of claim 6 wherein said operating member has a camming surface at one end thereof and two latching recesses immediately adjacent said camming surface and separated therefrom by shoulders and each said camming member has an inclined camming surface with a nose portion at the end thereof, each of said inclined camming surfaces being arranged to impose said lateral component of movement on said operating member camming surface when its corresponding manual control alone is operated and to have its nose portion placed in latching engagement in one of said latching recesses when the differential movement between said inclined camming surfaces exceeds a predetermined distance, and to impart said balanced camming action on said operating member camming surface to move said operating member to said actuating position when both manual controls are operated substantially simultaneously.

8. The device of claim 7 wherein said operating member camming surface is a smoothly curved surface.

9. The device of claim 6 wherein said releasing structure includes means manually operable independently of said manual controls for moving said operating member to release the engaged camming member.

10. The device of claim 9 and further including a compartment in which said operating member and said camming members are mounted, and wherein said releasing structure includes structure projecting from said operating member and said manually operable means includes an element mounted in said compartment and movable into engagement with said projecting structure.

11. The device of claim 10 wherein said projecting structure includes two pins projecting laterally in opposite directions from said operating member and said manually operable means comprises a sleeve, said sleeve carrying two arms projecting laterally in opposite directions from said sleeve and being arranged to be rotated in either of two directions, each of said arms being arranged and in response to rotation of said sleeve in one of said two directions to engage one of said pins and to cooperate with said pin to rotate said operating member and to disengage one of said nose portions and its corresponding inclined camming surface from one of said latching recesses when said nose portion and said corresponding inclined camming surface is locked in said one latching recess.

12. The device of claim 10 wherein said operating member further comprises an actuating structure at the opposite end thereof from said operating member camming surface, said actuating structure comprising an outlet orifice adapted to be connected to an air supply and arranged to apply air pressure and an inlet orifice in said compartment adapted to communicate with a controlled device sensitive to air pressure, said outlet orifice being arranged to be aligned with said inlet orifice and to apply air to said controlled device when said operating member is in said actuating position.